(12) United States Patent
Gudivada et al.

(10) Patent No.: US 12,462,613 B2
(45) Date of Patent: Nov. 4, 2025

(54) CONTROLLING AN ACTIVE FINGERPRINT SENSOR AREA

(71) Applicant: QUALCOMM Incorporated, San Diego, CA (US)

(72) Inventors: Naga Chandan Babu Gudivada, Hyderabad (IN); Rakesh Pallerla, Hyderabad (IN); Prakash Tiwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/929,616

(22) Filed: Sep. 2, 2022

(65) Prior Publication Data
US 2024/0078847 A1  Mar. 7, 2024

(51) Int. Cl.
*G06V 40/60* (2022.01)
*G06F 21/32* (2013.01)
*G06V 40/13* (2022.01)
*G06V 40/50* (2022.01)

(52) U.S. Cl.
CPC ............ *G06V 40/67* (2022.01); *G06F 21/32* (2013.01); *G06V 40/1306* (2022.01); *G06V 40/50* (2022.01)

(58) Field of Classification Search
CPC .... G06V 40/67; G06V 40/1306; G06V 40/50; G06V 40/13; G06F 21/32
See application file for complete search history.

(56) References Cited

U.S. PATENT DOCUMENTS

| | | |
|---|---|---|
| 2018/0157893 A1 | 6/2018 | Lee et al. |
| 2020/0167537 A1 | 5/2020 | Lee |
| 2021/0049392 A1* | 2/2021 | Juncker ................ G06V 40/67 |

FOREIGN PATENT DOCUMENTS

| | | |
|---|---|---|
| CN | 107122748 A | 9/2017 |
| WO | 2018196699 A1 | 11/2018 |

OTHER PUBLICATIONS

International Search Report and Written Opinion—PCT/US2023/069269—ISA/EPO—Oct. 11, 2023.

* cited by examiner

*Primary Examiner* — Abhishek Sarma
(74) *Attorney, Agent, or Firm* — QUALCOMM Incorporated

(57) ABSTRACT

Methods, devices and systems for controlling an active fingerprint sensor area of a fingerprint sensor system are disclosed. In some examples, the one or more active fingerprint sensor area criteria may involve, or correspond to, a security level. The security level may correspond to a data security level, a software application security level, or a combination thereof. According to some examples, controlling the active fingerprint sensor area may involve activating a relatively larger fingerprint sensor area for a relatively higher security level. Alternatively, or additionally, the one or more active fingerprint sensor area criteria may correspond to a fingerprint sensor area used for obtaining fingerprint sensor data from one or more digits involved in an enrollment process, the size of one or more digits used during the enrollment process, the size of one or more digits used for one or more recent authentication attempts, or combinations thereof.

26 Claims, 10 Drawing Sheets

CONTROLLING AN ACTIVE FINGERPRINT SENSOR AREA

TECHNICAL FIELD

This disclosure relates generally to sensor devices and related methods, including but not limited to fingerprint sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in a method. In some examples, the method may involve determining, by a control system of a device that includes the fingerprint sensor system, one or more active fingerprint sensor area criteria. In some examples, at least one of the one or more active fingerprint sensor area criteria may involve a security level. The method may involve controlling, by the control system, the active fingerprint sensor area according to the one or more active fingerprint sensor area criteria.

In some examples, the method may involve providing a prompt corresponding with the active fingerprint sensor area. According to some such examples, providing the prompt may involve controlling a display to present an image corresponding with the active fingerprint sensor area.

According to some examples, at least one of the one or more active fingerprint sensor area criteria may involve functionality of the device that includes the fingerprint sensor system. The functionality may, for example, include functionality of one or more software applications.

In some examples, controlling the active fingerprint sensor area may involve activating a relatively larger fingerprint sensor area for a relatively higher security level.

According to some examples, the security level may correspond to a data security level. Alternatively, or additionally, the security level may correspond to a software application security level.

In some examples, at least one of the one or more active fingerprint sensor area criteria may correspond to a size of one or more digits involved in an enrollment process. According to some examples, at least one of the one or more active fingerprint sensor area criteria may correspond to a fingerprint sensor area used for obtaining fingerprint sensor data from one or more digits involved in an enrollment process.

According to some examples, at least one of the one or more active fingerprint sensor area criteria may involve one or more recent authentication attempts via the fingerprint sensor system. For example, controlling the active fingerprint sensor area may involve controlling the active fingerprint sensor area to correspond with a digit size used during the one or more recent authentication attempts. Alternatively, or additionally, controlling the active fingerprint sensor area may involve controlling the active fingerprint sensor area according to an authentication success rate during a plurality of recent authentication attempts.

In some examples, controlling the active fingerprint sensor area may involve dynamically controlling a fingerprint sensor tile size.

According to some examples, at least one of the one or more active fingerprint sensor area criteria may correspond to an orientation of the device that includes the fingerprint sensor system.

Other innovative aspects of the subject matter described in this disclosure may be implemented in an apparatus. In some examples, the apparatus may include a fingerprint sensor system having an active fingerprint sensor area. In some examples, the apparatus may include a control system configured for communication with the fingerprint sensor system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be further configured to determine one or more active fingerprint sensor area criteria. In some examples, at least one of the one or more active fingerprint sensor area criteria may involve a security level. According to some examples, the control system may be further configured to control the active fingerprint sensor area according to the one or more active fingerprint sensor area criteria.

In some examples, the control system may be further configured to provide a prompt corresponding with the active fingerprint sensor area. In some such examples, the apparatus may include a display and providing the prompt may involve controlling the display to present an image corresponding with the active fingerprint sensor area.

According to some examples, at least one of the one or more active fingerprint sensor area criteria may involve functionality of the apparatus. Alternatively, or additionally, the functionality may include functionality of one or more software applications.

In some examples, controlling the active fingerprint sensor area may involve activating a relatively larger fingerprint sensor area for a relatively higher security level.

According to some examples, the security level may correspond a data security level, a software application security level, or a combination thereof.

In some examples, at least one of the one or more active fingerprint sensor area criteria may correspond to a size of one or more digits involved in an enrollment process, a fingerprint sensor area used for obtaining fingerprint sensor data from one or more digits involved in an enrollment process, or combinations thereof.

According to some examples, controlling the active fingerprint sensor area may involve controlling the active fingerprint sensor area to correspond with a digit size used during one or more recent authentication attempts. Alternatively, or additionally, controlling the active fingerprint sensor area may involve controlling the active fingerprint sensor area according to an authentication success rate during a plurality of recent authentication attempts.

In some examples, controlling the active fingerprint sensor area may involve dynamically controlling a fingerprint sensor tile size.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve determining, by a control system of a device that includes the fingerprint sensor system, one or more active fingerprint sensor area criteria. In some examples, at least one of the one or more active fingerprint sensor area criteria may involve a security level. The method may involve controlling, by the control system, the active fingerprint sensor area according to the one or more active fingerprint sensor area criteria.

In some examples, the method may involve providing a prompt corresponding with the active fingerprint sensor area. According to some such examples, providing the prompt may involve controlling a display to present an image corresponding with the active fingerprint sensor area.

According to some examples, at least one of the one or more active fingerprint sensor area criteria may involve functionality of the device that includes the fingerprint sensor system. The functionality may, for example, include functionality of one or more software applications.

In some examples, controlling the active fingerprint sensor area may involve activating a relatively larger fingerprint sensor area for a relatively higher security level.

According to some examples, the security level may correspond to a data security level. Alternatively, or additionally, the security level may correspond to a software application security level.

In some examples, at least one of the one or more active fingerprint sensor area criteria may correspond to a size of one or more digits involved in an enrollment process. According to some examples, at least one of the one or more active fingerprint sensor area criteria may correspond to a fingerprint sensor area used for obtaining fingerprint sensor data from one or more digits involved in an enrollment process.

According to some examples, at least one of the one or more active fingerprint sensor area criteria may involve one or more recent authentication attempts via the fingerprint sensor system. For example, controlling the active fingerprint sensor area may involve controlling the active fingerprint sensor area to correspond with a digit size used during the one or more recent authentication attempts. Alternatively, or additionally, controlling the active fingerprint sensor area may involve controlling the active fingerprint sensor area according to an authentication success rate during a plurality of recent authentication attempts.

In some examples, controlling the active fingerprint sensor area may involve dynamically controlling a fingerprint sensor tile size.

According to some examples, at least one of the one or more active fingerprint sensor area criteria may correspond to an orientation of the device that includes the fingerprint sensor system.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
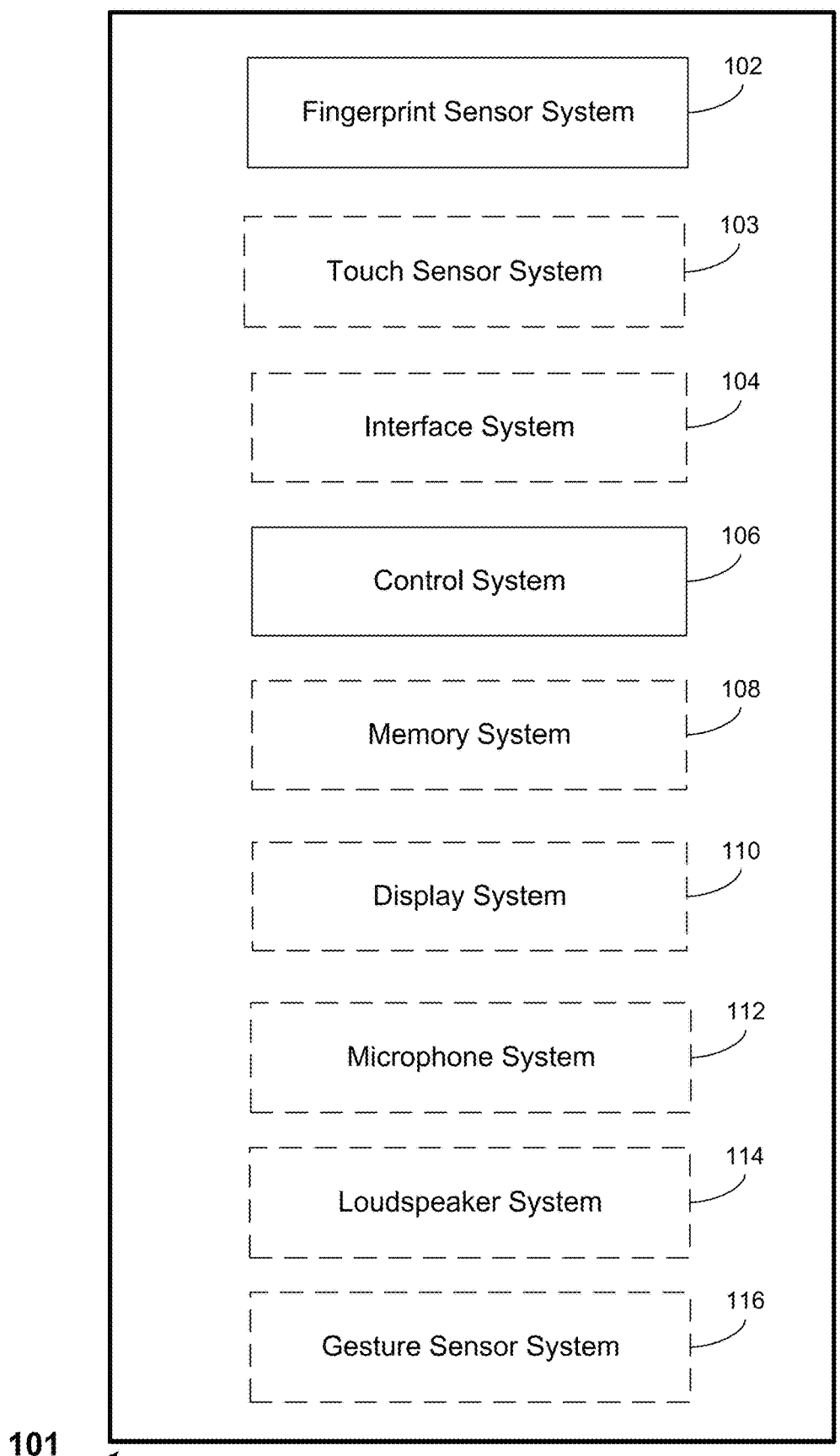
FIG. 1 shows an example of a block diagram that includes components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The word "finger" as used herein may correspond to any digit, including a thumb. Accordingly, as used herein, a thumbprint is a type of fingerprint. The portion of a finger used for authentication may vary from finger to finger. For example, even a small active fingerprint sensor area may be able to capture most of the fingerprint of a person's pinky finger, whereas the same active fingerprint sensor area may be able to capture only a portion of the fingerprint of the same person's thumb. The portion of a finger used for authentication also generally varies from person to person. For example, a relatively small active fingerprint sensor area may be able to capture most of the fingerprint of a child or of a relatively small adult, whereas the same active fingerprint sensor area may not be able to capture most of the fingerprint of a relatively larger adult's thumb, index finger or middle finger. Therefore, in some instances, a relatively small active fingerprint sensor area may only be able to capture a partial fingerprint. The size of the captured partial fingerprint may, in some instances, be further reduced by a non-optimal placement of a finger, such that the finger is presented only partially to a fingerprint scanner. Nonetheless, the active area of a fingerprint sensor is normally static.

Some disclosed methods involve adaptive activation of fingerprint sensor areas. Some such methods involve controlling an active fingerprint sensor area of a fingerprint sensor system based on one or more active fingerprint sensor area criteria. In some examples, the one or more active fingerprint sensor area criteria may involve, or correspond to, a security level. The security level may correspond to a data security level, a software application security level, or a combination thereof. According to some examples, controlling the active fingerprint sensor area may involve activating a relatively larger fingerprint sensor area for a relatively higher security level. Alternatively, or additionally, at least one of the one or more active fingerprint sensor area criteria may correspond to the size of a fingerprint sensor area used for obtaining fingerprint sensor data from one or more digits involved in an enrollment process.

In some or all of the methods disclosed herein, the active fingerprint sensor area is not controlled responsive to detecting the size of a target object on or proximate the device that includes the fingerprint sensor system. For example, in some or all of the methods disclosed herein, the active fingerprint sensor area is not controlled based on touch screen input corresponding to the size of a target object that is being used for a current authentication attempt. Instead, such methods generally involve determining the active fingerprint sensor area before a user presents a finger for an authentication attempt. However, some disclosed examples may involve controlling the active fingerprint sensor area to correspond with a digit size, or the size of an area occupied by multiple digits, that were used during one or more recent authentication attempts.

Particular implementations of the subject matter described in this disclosure may be implemented to realize one or more of the following potential advantages. Some disclosed methods can reduce the power consumption of a fingerprint sensor system. In some such examples, less power is wasted by controlling the active fingerprint sensor area to be no larger than needed for a particular security level. According to some examples, less power is wasted by controlling the active fingerprint sensor area to be no larger than needed for a particular expected digit size, or to be no larger than needed for obtaining data from multiple digits having expected digit sizes. The power savings may include power saved by reducing the usage of a fingerprint sensor transmitter, as well as power saved by reducing the corresponding amount of fingerprint image processing. Less usage of one or more fingerprint sensor areas also may prolong the useful lifetime of a fingerprint sensor system.

FIG. 1 is a block diagram that shows example components of an apparatus according to some disclosed implementations. In this example, the apparatus 101 includes a fingerprint sensor system 102 and a control system 106. Some implementations may include a touch sensor system 103, an interface system 104, a memory system 108, a display system 110, a microphone system 112, a loudspeaker system 114, a gesture sensor system 116, or combinations thereof.

According to some examples, the fingerprint sensor system 102 may be, or may include, an ultrasonic fingerprint sensor. Alternatively, or additionally, in some implementations the fingerprint sensor system 102 may be, or may include, another type of fingerprint sensor, such as an optical fingerprint sensor, a capacitive fingerprint sensor, a thermal fingerprint sensor, etc. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. In implementations wherein the apparatus includes a touch sensor system 103, the control system 106 may be configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a display system 110, the control system 106 may be configured for communication with, and for controlling, the display system 110. In implementations wherein the apparatus includes a microphone system 112, the control system 106 may be configured for communication with, and for controlling, the microphone system 112. In implementations wherein the apparatus includes an loudspeaker system 114, the control system 106 may be configured for communication with, and for controlling, the loudspeaker system 114. According to some examples, the control system 106 may include one or more dedicated components that are configured for controlling the fingerprint sensor system 102, the touch sensor system 103, the memory system 108, the display system 110, the microphone system 112 and/or the loudspeaker system 114.

Some examples of the apparatus 101 may include dedicated components that are configured for controlling at least a portion of the fingerprint sensor system 102 (and/or for processing fingerprint image data received from the fingerprint sensor system 102). Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones, one or more types of microphones, or combinations thereof.

According to some implementations, the apparatus 101 may include an loudspeaker system 114. The loudspeaker system 114 may include one or more loudspeakers, one or more types of loudspeakers, or combinations thereof.

In some implementations, the apparatus 101 may include a gesture sensor system 116. The gesture sensor system 116 may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
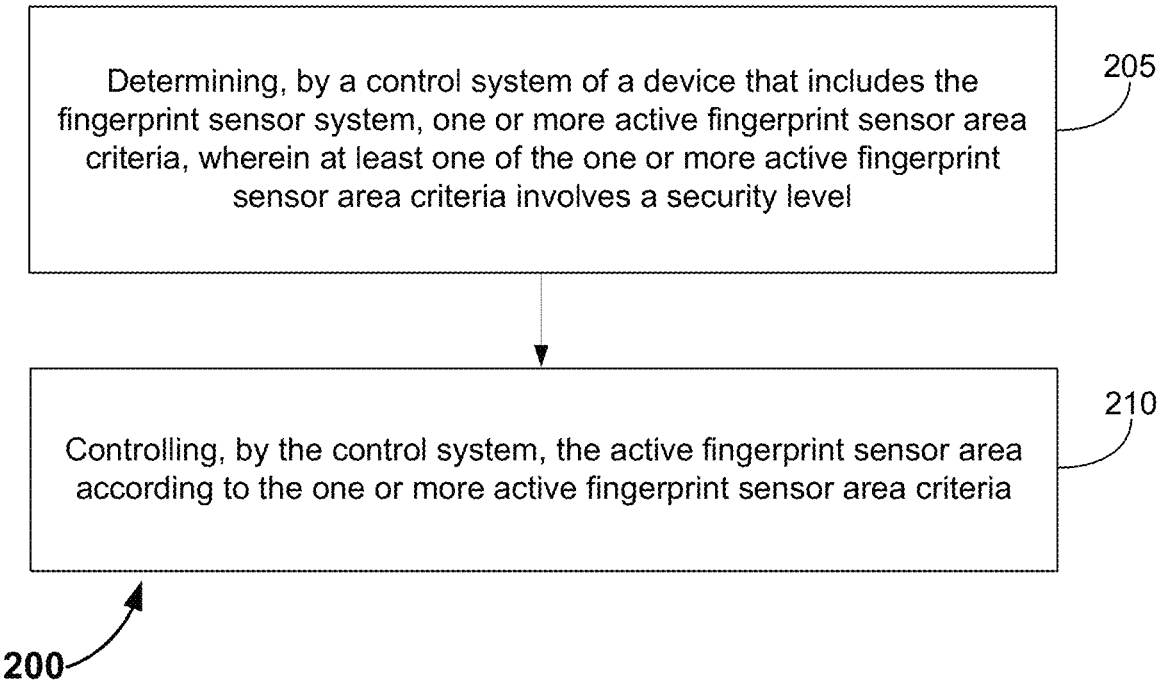
FIG. 2 shows an example of a flow diagram that presents examples of operations according to some disclosed methods.

FIG. 2 is a flow diagram that presents examples of operations according to some disclosed methods. The blocks of FIG. 2 may be performed by an apparatus that includes at least a fingerprint sensor system and a control system. The blocks of FIG. 2 may, for example, be performed by the apparatus 101 of FIG. 1 or by a similar apparatus. For example, in some implementations the control system 106 of FIG. 1 may be configured to perform, at least in part, the operations that are described herein with reference to FIG. 2. In some examples, the apparatus may be a mobile device, such as a cellular telephone. However, in other examples, the apparatus may be another type of device, such as a tablet, a laptop, an automobile or component thereof, a wearable device, etc. As with other methods disclosed herein, the methods outlined in FIG. 2 may include more or fewer blocks than indicated. Moreover, the blocks of methods disclosed herein are not necessarily performed in the order indicated. In some implementations, one or more blocks may be performed concurrently.

According to this example, method 200 is a method of controlling an active fingerprint sensor area of a fingerprint sensor system. In this example, block 205 involves determining, by a control system of a device that includes the fingerprint sensor system, one or more active fingerprint sensor area criteria. According to this example, at least one of the one or more active fingerprint sensor area criteria involves a security level. In some alternative examples, the one or more active fingerprint sensor area criteria may not involve a security level. Various other types of active fingerprint sensor area criteria are disclosed herein.

In some examples, the security level of block 205 may correspond to a data security level. Alternatively, or additionally, in some examples the security level may correspond to a software application or "app" security level. Alternatively, or additionally, in some examples the security level may correspond to a device functionality security level. In some examples, at least one of the one or more active fingerprint sensor area criteria may involve functionality of the device that includes the fingerprint sensor system. Criteria involving device functionality may or may not directly relate to a security level, depending on the particular implementation. Similarly, the device functionality may or may not involve the functionality of one or more software applications, depending on the particular implementation. For example, some device functionality may correspond to application layer functionality, whereas other device functionality may correspond to another layer, such as the physical layer, the media access control layer, etc.

In some examples, a user may designate two or more levels of data security, app security, device functionality, or combinations thereof. In some such examples, the user may designate two or more levels of security via one or more graphical user interfaces (GUIs) that are presented during an initial device set-up process. According to some examples, the user may be able to revise security settings after a device is initially set up, such as via "Settings" or "Control Panel" software provided with the device. Alternatively, or additionally, some types of data, software or device functionality may be automatically assigned higher security levels than other types of data, software or device functionality. In some data security examples, certain types of data, such as financial data, Social Security numbers, etc., may have, or may be assigned, a higher security level than information that a user chooses to share (or that a typical user would choose to share) with numerous other individuals, or information that a user would not object to sharing with other individuals. In some software application security examples, banking apps, payment apps, health service provider apps, etc., may have, or may be assigned, a higher security level than weather apps, apps for learning a language, news apps, podcast apps, or other apps that provide, or allow access to, information that a user would not object to sharing with other individuals.

According to some data security examples, a user may be able to designate (for example, via one or more GUIs) two or more security levels for the same type of data, such as photos, videos, etc. A user may regard some photos or videos as being very private or highly confidential. The user may designate such photos or videos with a high (or relatively higher) security level, whereas the user may designate other photos or videos, which the user is willing to make available for sharing with a wide audience, with a low (or relatively lower) security level.

In this example, block 210 involves controlling, by the control system, the active fingerprint sensor area according to the one or more active fingerprint sensor area criteria. Some examples may involve providing a prompt corresponding with the active fingerprint sensor area. According to some such examples, providing the prompt may involve controlling a display to present an image, such as a fingerprint image, corresponding with the active fingerprint sensor area. Alternatively, or additionally, the prompt may be, or may include, a textual prompt, an audio prompt, etc.

According to some examples, controlling the active fingerprint sensor area may involve activating a relatively larger fingerprint sensor area for a relatively higher security level. Activating a relatively larger fingerprint sensor area may allow for a larger volume of fingerprint image data to be obtained from each digit involved in an authentication process. Accordingly, activating a relatively larger fingerprint sensor area may be advantageous because of the potential for a more reliable authentication process. If a relatively larger fingerprint sensor area is used for authentication, the higher reliability may result in a slightly increased cost in terms of power usage and computational overhead. However, if a relatively higher security level is desired or required, such additional costs may be warranted.

Alternatively, or additionally, at least one of the one or more active fingerprint sensor area criteria may involve one or more recent authentication attempts via the fingerprint sensor system. For example, controlling the active fingerprint sensor area may involve controlling the active fingerprint sensor area to correspond with a digit size used during one or more recent authentication attempts, controlling the active fingerprint sensor area to correspond with a digit area that has been in contact with the device during one or more recent authentication attempts, etc. Such implementations may be advantageous, for example, if the size of the active fingerprint sensor area during the one or more recent authentication attempts was larger than necessary for the digit size used during the one or more recent authentication attempts. In some such implementations, the size of the active fingerprint sensor area may be reduced to correspond with the expected digit size used during the next authentication attempt, and power may be saved. Such implementations also may be advantageous if, for example, the size of the active fingerprint sensor area during the one or more recent authentication attempts was not as large as would be optimal for the digit size used during the one or more recent authentication attempts. In some such implementations, the size of the active fingerprint sensor area may be increased to correspond with the expected digit size used during the next authentication attempt, and a more accurate authentication process may result.

Alternatively, or additionally, controlling the active fingerprint sensor area may involve controlling the active fingerprint sensor area according to an authentication success rate during a plurality of (in other words, two or more) recent authentication attempts. For example, if a threshold percentage (such as 20%, 25%, 30%, 35%, 40%, etc.) of recent authentication attempts involving a particular digit, or combination of digits, has been unsuccessful, in some instances the size of the active fingerprint sensor area may be increased in order to obtain relatively more fingerprint image data from the particular digit, or combination of digits, that is expected to be used in the next authentication attempt. Such examples may be advantageous because obtaining relatively more fingerprint image data from the particular digit, or combination of digits, may result in a higher success rate and therefore in greater user satisfaction. Such examples also may result in lower power consumption and slower aging of the fingerprint sensor system, due to the reduced number of authentication attempts that would be required.

In some examples, at least one of the one or more active fingerprint sensor area criteria may correspond to a size of one or more digits involved in an enrollment process, with the area(s) in contact with the apparatus when the one or more digits were involved in an enrollment process, or combinations thereof. For example, if an authorized user's right thumb will be used, or is expected to be used, in an authentication process, the active fingerprint sensor area may be based, at least in part, on the size of the thumb, as determined during an enrollment process. Alternatively, or additionally, at least one of the one or more active fingerprint sensor area criteria may correspond to a fingerprint sensor area used for obtaining fingerprint sensor data from one or more digits involved in an enrollment process. For example, if an authorized user's left index finger and left middle finger will be used, or are expected to be used, in an authentication process, the active fingerprint sensor area may be based, at least in part, on a fingerprint sensor area used for obtaining fingerprint sensor data from the left index finger and left middle finger during an enrollment process.

In some examples, controlling the active fingerprint sensor area may involve controlling a fingerprint sensor tile size. According to some such examples, controlling the active fingerprint sensor area may involve reducing or enlarging one or more fingerprint sensor tile sizes based, at least in part, on the size of one or more digits that are, or are expected to be, used in an authentication attempt. Alternatively, or additionally, controlling the active fingerprint sensor area may involve reducing or enlarging one or more fingerprint sensor tile sizes based, at least in part, on a fingerprint sensor area used (for example, the fingerprint sensor area(s) used during an enrollment process) for obtaining fingerprint sensor data from one or more digits that are, or are expected to be, used in an authentication attempt.

Figure 3A:
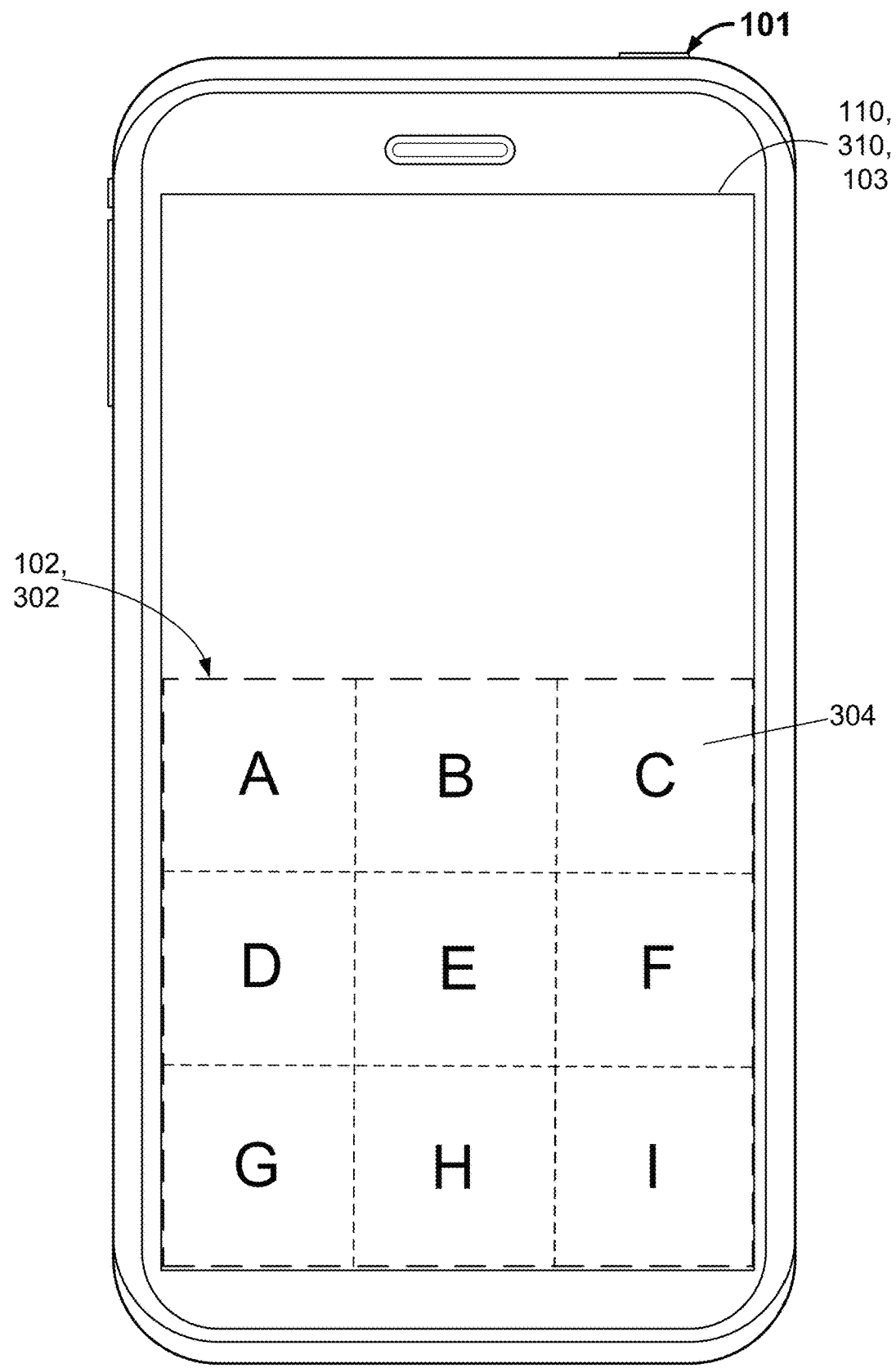
FIG. 3A shows an example of an apparatus configured to perform at least some disclosed methods.

FIG. 3A shows an example of an apparatus configured to perform at least some disclosed methods. As with other disclosed examples, the types, numbers and arrangements of elements that are shown in FIG. 3A are merely presented by way of example. Other examples may include different types of elements, numbers of elements, arrangements of elements, or combinations thereof.

In this example, the apparatus 101 is an instance of the apparatus 101 of FIG. 1. In this implementation, the apparatus 101 is a mobile device that includes a fingerprint sensor system 102, a control system 106 (not shown in FIG. 3A) and a display system 110. The fingerprint sensor system 102 may be, or may include, an ultrasonic fingerprint sensor, an optical fingerprint sensor, or another type of fingerprint sensor.

According to this example, a potentially active area 302 of the fingerprint sensor system 102 is outlined in large dashes. The potentially active area 302 may, for example, be an area that includes an array of fingerprint sensor pixels of the fingerprint sensor system 102. The array of fingerprint sensor pixels may include receiver pixels, transceiver pixels, etc., depending on the type of fingerprint sensor and the particular implementation. According to this example, the potentially active area 302 corresponds with approximately half of the display area 310 of the display system 110. In alternative implementations, the potentially active area 302 may correspond with a larger portion or a smaller portion of the display area 310.

In this example, the potentially active area 302 includes fingerprint sensor tiles A, B, C, D, E, F, G, H and I, making a total of nine fingerprint sensor tiles 304. According to this example, each of the fingerprint sensor tiles 304 includes a portion of the array of fingerprint sensor pixels of the potentially active area 302. According to some implementations, the control system may be configured to selectively activate a portion of the potentially active area 302 corresponding to one or more of the fingerprint sensor tiles 304. The letters on each tile are shown for ease of reference for this disclosure, and would not normally be made visible to a user of the apparatus 101. In some alternative implementations, the potentially active area 302 may include more than nine or fewer than nine fingerprint sensor tiles 304, such as four fingerprint sensor tiles 304, six fingerprint sensor tiles 304, eight fingerprint sensor tiles 304, twelve fingerprint sensor tiles 304, sixteen fingerprint sensor tiles 304, twenty fingerprint sensor tiles 304, twenty-four fingerprint sensor tiles 304, twenty-five fingerprint sensor tiles 304, twenty-eight fingerprint sensor tiles 304, thirty fingerprint sensor tiles 304, thirty-six fingerprint sensor tiles 304, etc. References in this disclosure to the apparatus shown in FIG. 3A are intended to encompass all such alternative implementations.

Figure 3B:
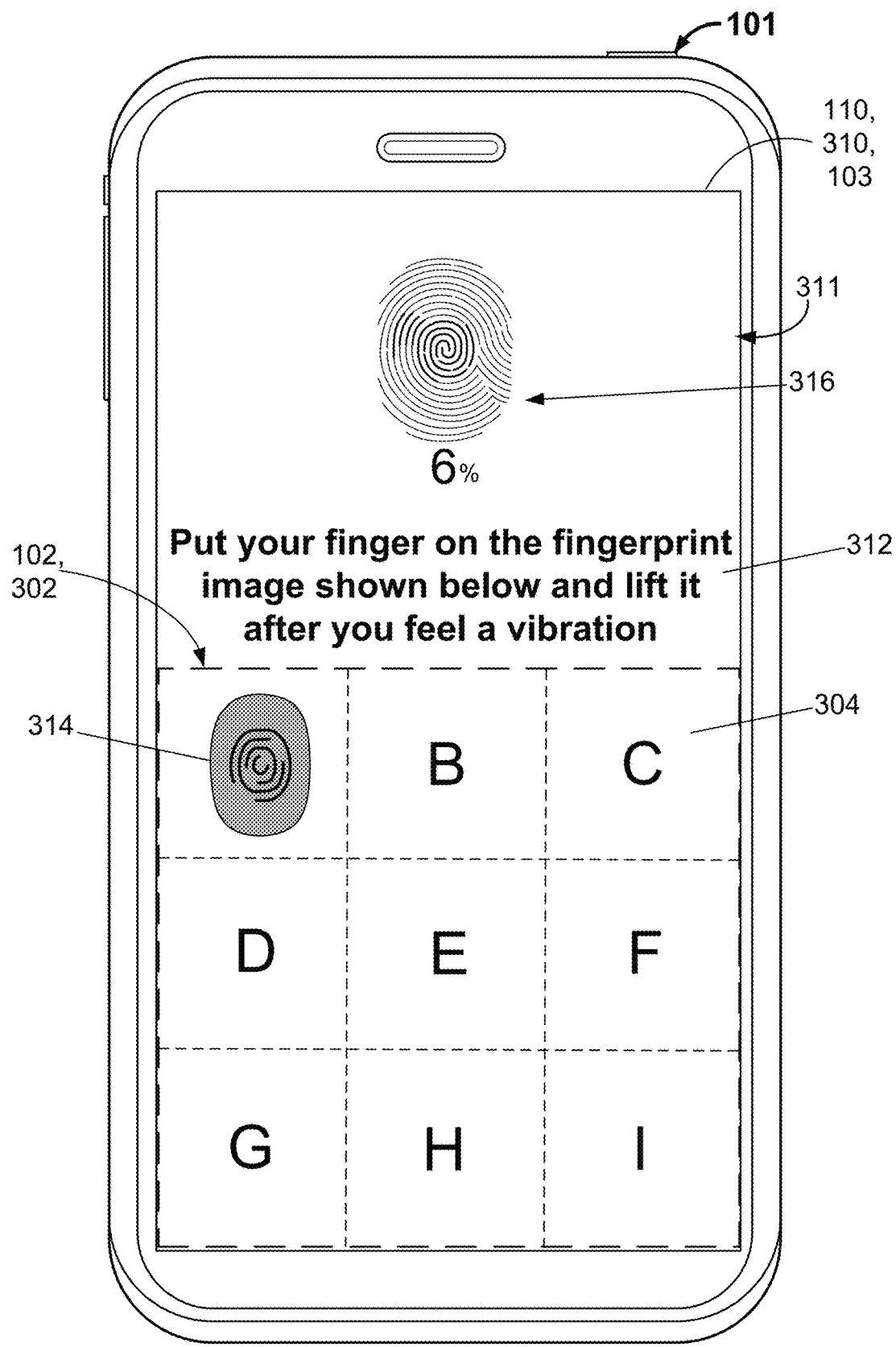
FIG. 3B shows an example of a graphical user interface (GUI) that may be used for enrolling a single digit using the apparatus shown in FIG. 3A.

FIG. 3B shows an example of a graphical user interface (GUI) that may be used for enrolling a single digit using the apparatus shown in FIG. 3A. FIG. 3B shows an example of a GUI 311. In this example, GUI 311 includes a textual prompt area 312, a fingerprint icon 314 and a progress indicator 316. According to this example, the textual prompt area 312 includes a message prompting a user to put a finger on the fingerprint icon 314. In some implementations, the GUI 311 may include a textual prompt for the user to place a particular digit (such as the right thumb, the left pinky finger, etc.) on the fingerprint icon 314. In this example, the control system 106 (not shown) is configured to initially activate only the fingerprint sensor tile A, in which the fingerprint icon 314 is displayed, for this stage of the enrollment process. In some examples, the control system may be configured to activate one of more additional fingerprint sensor tiles, such as the fingerprint sensor tile B, the fingerprint sensor tile D, a portion of one or more fingerprint sensor tiles, or combinations thereof, responsive to determining that the fingerprint sensor tile A is not large enough to enroll the current digit.

In some such examples, the control system may determine and record the size of the current digit, the area of the current digit that is in contact with the apparatus 101, or a combination thereof, as part of the enrollment process. Alternatively, or additionally, the control system may determine and record what portion of the potentially active area 302 was required, or used, to enroll the current digit. In some such examples, if the control system determines that the fingerprint sensor tile A was large enough to enroll the current digit, the control system would simply store information to the effect that one fingerprint sensor tile was sufficient to enroll the current digit. However in some examples, if only a portion of the fingerprint sensor tile A (such as 40%, 50%, 60%, 70%, etc.) was sufficient to enroll the current digit, the control system may store information indicating what portion (for example, what percentage) of the fingerprint sensor tile was sufficient to enroll the current digit. Similarly, in some examples, if more than the fingerprint sensor tile A (such as 110%, 120%, 130%, 140%, etc.) was required, or used, to enroll the current digit, the control system may store information indicating what portion (for example, what percentage) of one or more adjacent fingerprint sensor tiles was required to enroll the current digit.

According to this example, the textual prompt area 312 includes a message prompting a user to lift the finger after the user feels a vibration. The vibration may, for example, be caused by a haptic feedback system of the apparatus 101, which may be part of the interface system 104 in some examples. In some such examples, the control system 106 may be configured to activate the haptic feedback system after fingerprint image data has been successfully obtained by a fingerprint sensor system 102. According to some examples, the control system 106 may be configured to activate the haptic feedback system after only a portion of the desired amount of fingerprint image data has been successfully obtained by the fingerprint sensor system 102. Some such implementations may prompt the user to place the finger on the apparatus 101 and lift the finger from the apparatus 101 multiple times during the enrollment process.

According to this example, progress indicator 316 indicates a completion percentage for the enrollment of the current digit. In some examples, fingerprint image data may be successfully obtained from the fingerprint sensor system 102 in fingerprint sensor area A. The fingerprint image data may be used in a subsequent authentication process that may, for example, be performed by the control system 106.

As noted elsewhere herein, according to some examples at least one of the one or more active fingerprint sensor area criteria that are disclosed herein (such as with reference to method 200 of FIG. 2) may correspond to a size of one or more digits involved in an enrollment process, to one or more contact areas of the one or more digits with the apparatus 101 during the enrollment process, or combinations thereof. Alternatively, or additionally, at least one active fingerprint sensor area criterion may correspond to a fingerprint sensor area used for obtaining fingerprint sensor data from one or more digits involved in an enrollment process.

FIGS. 4A, 4B, 5A and 5B show examples of controlling an active fingerprint sensor area during enrollment processes. In some such examples, one or more types of data corresponding to, or relating to, controlling an active fingerprint sensor area during an enrollment process may be stored and subsequently used during a "run time" operation, such as during an authentication attempt involving the same fingerprint sensor. Such data may include data corresponding to a size of one or more digits involved in an enrollment process, data corresponding to one or more contact areas of one or more digits involved in an enrollment process, data corresponding to a fingerprint sensor area used for obtaining fingerprint sensor data from one or more digits involved in an enrollment process, or a combination thereof.

Figure 4A:
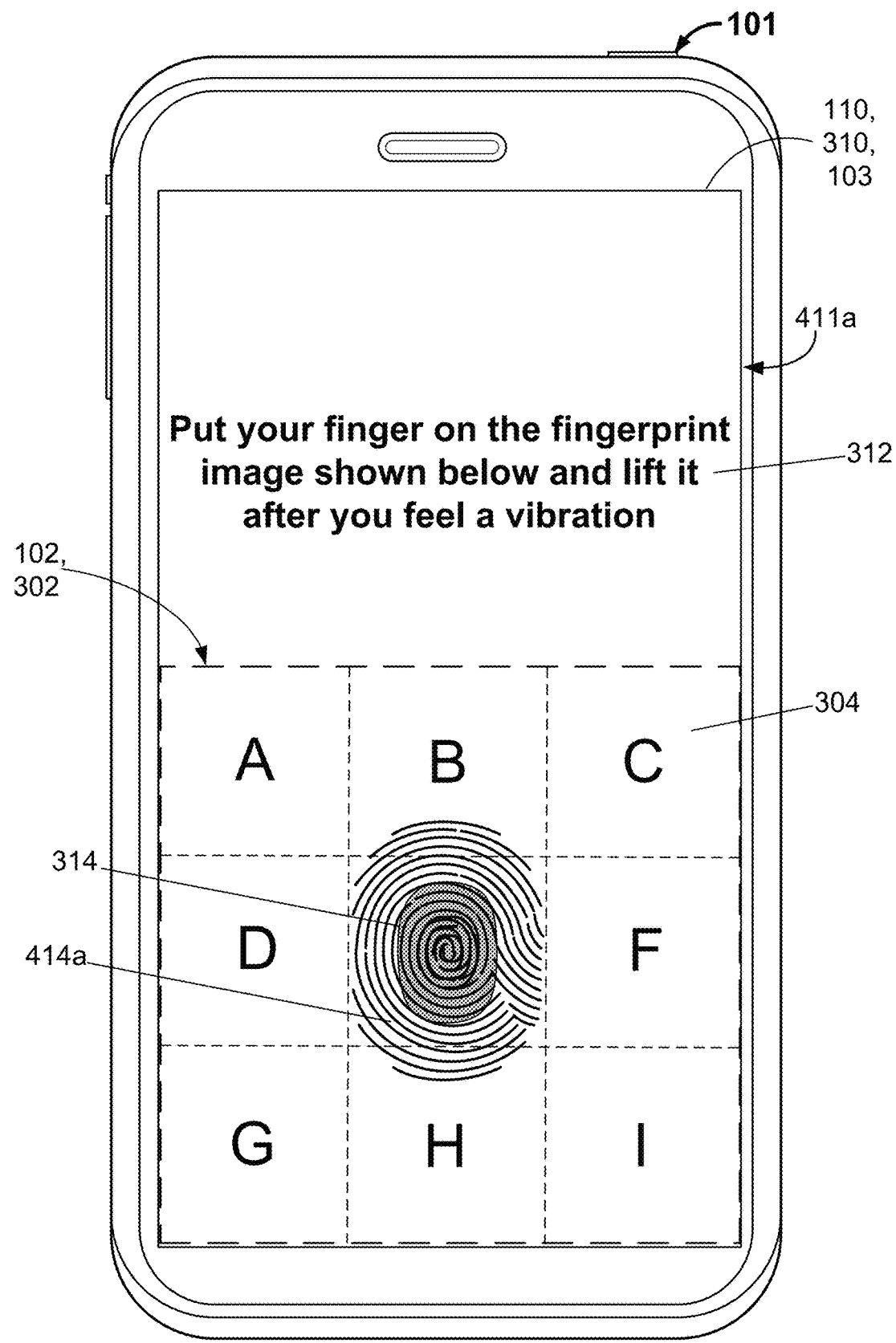
FIGS. 4A, 4B, 5A and 5B show examples of controlling an active fingerprint sensor area during enrollment processes.
Figure 4B:
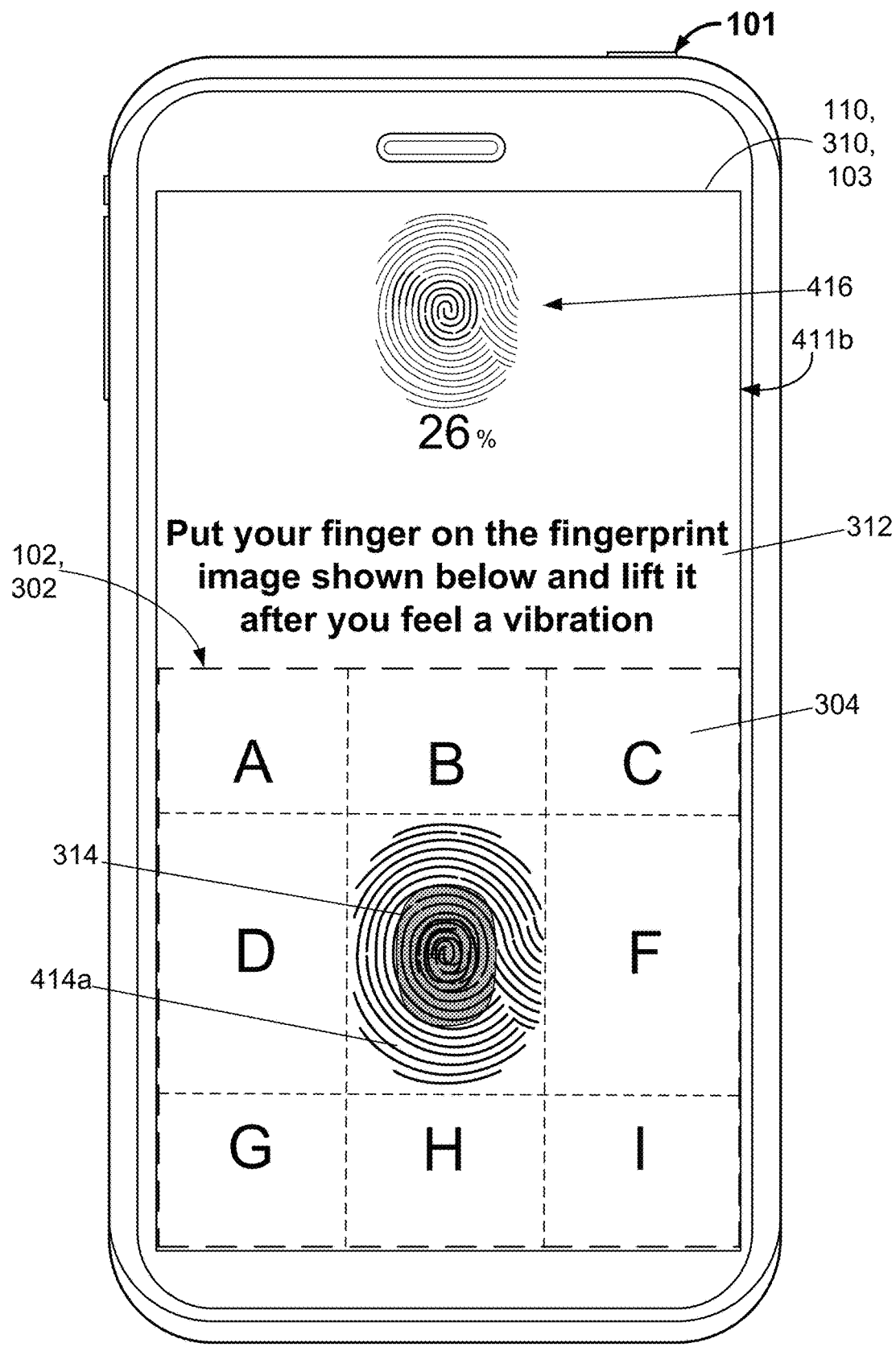

FIGS. 4A and 4B show examples of GUIs that may be presented during a process of enrolling a single digit using the apparatus shown in FIG. 3A. FIG. 4A shows an example of a GUI 411a. In this example, GUI 411a includes a textual prompt area 312 and a fingerprint icon 314. According to this example, the textual prompt area 312 includes a message prompting a user to put a finger on the fingerprint icon 314. In some implementations, the GUI 411a may include a textual prompt for the user to place a particular digit (such as the right thumb, the left pinky finger, etc.) on the fingerprint icon 314. Alternatively, or additionally, the GUI 411a (or another GUI disclosed herein) may include a textual prompt for the user to identify a particular digit this is placed, or will be placed, on the fingerprint icon 314. In some examples, the control system 106 (not shown) may be configured to initially activate only the fingerprint sensor tile E, in which the fingerprint icon 314 is displayed, for this stage of the enrollment process.

In this example, the area of a digit that is in contact with the apparatus 101 is indicated by the fingerprint image 414a. The control system would generally not control the display 310 to present the fingerprint image 414a to a user, whether during the enrollment process or otherwise. Instead, the fingerprint image 414a is shown merely to indicate the size of the digit and the area of a digit that is in contact with the apparatus 101. Similarly, as noted elsewhere herein, the control system would generally not control the display 310 to present any depiction of the fingerprint sensor tiles A-I to a user, whether during the enrollment process or otherwise.

In this example, the control system detects (for example, according to touch sensor data received from the touch sensor 103 (not shown), according to fingerprint image data received from the fingerprint sensor system 102, or a combination thereof) that the area of a digit that is in contact with the apparatus 101 extends beyond the fingerprint sensor tile E into the fingerprint sensor tiles B and H. According to this example, the control system is configured to activate at least a portion of one of more additional fingerprint sensor tiles responsive to determining that that the area of a digit that is in contact with the apparatus 101 extends beyond the fingerprint sensor tile E, or beyond any other fingerprint sensor tile that may be used during the enrollment process.

FIG. 4B shows an example of a GUI 411b. According to this example, the GUI 411b is presented after the GUI 411a is presented. In this example, GUI 411b includes a textual prompt area 312, a fingerprint icon 314 and a progress indicator 416. According to this example, the control system is configured to control fingerprint sensor tile sizes responsive to a determined or estimated digit size, responsive to a determined or estimated portion of the potentially active area 302 that will be used for obtaining fingerprint sensor data from the digit during an enrollment process, or a combination thereof. In this example, the control system has increased the size of the fingerprint sensor tile E to include portions of the potentially active area 302 that were previously designated as portions of the fingerprint sensor tiles B and H. Accordingly, the areas of fingerprint sensor tiles B and H have temporarily been decreased and the areas of fingerprint sensor tile E has temporarily been increased. In this particular example, the areas of fingerprint sensor tiles A, C, G and I also have temporarily been decreased and the areas of fingerprint sensor tiles D and F also have temporarily been increased.

According to some alternative examples, responsive to determining that that the area of a digit that is in contact with the apparatus 101 extends beyond the fingerprint sensor tile E into the fingerprint sensor tiles B and H, the control system may increase the size of the fingerprint sensor tile E to include portions of the potentially active area 302 that were previously designated as portions of the fingerprint sensor tiles B and H, but may not change the sizes of the fingerprint sensor tiles A, C, D, F, G or I. In some alternative examples, responsive to determining that that the area of a digit that is in contact with the apparatus 101 extends beyond the fingerprint sensor tile E into the fingerprint sensor tiles B and H, the control system may increase the size of the active fingerprint sensor area to include not only the fingerprint sensor tile E, but also to include the entireties of the fingerprint sensor tiles B and H.

In some examples, the control system may determine and record the size of the current digit as part of the enrollment process. Alternatively, or additionally, the control system may determine and record the area of the current digit in contact with the apparatus 101 during the enrollment process, what portion of the potentially active area 302 was required to enroll the current digit, or combinations thereof. In some examples in which the size of the fingerprint sensor tile E (or any other fingerprint sensor tile used to obtain fingerprint image data during the enrollment process) has been enlarged, for example as shown in FIG. 4B, the control system may record the current size of the fingerprint sensor tile E (or the current size of any other fingerprint sensor tile used to obtain fingerprint image data during the enrollment process).

According to some examples, the control system may be configured to subsequently activate a portion of the potentially active area 302 that is equal to the current size of the fingerprint sensor tile E in certain situations, responsive to certain conditions, or combinations thereof. One such condition or situation may involve a subsequent authentication attempt via the same fingerprint sensor system that involves, or is expected to involve, the same digit. In some such examples, the control system may be configured to activate a portion of the potentially active area 302 that is equal to the current size of the fingerprint sensor tile E in a high-security authentication condition, such as when high-security data is sought to be accessed, when a high-security software app is sought to be accessed, etc. According to some such examples, a default size of the fingerprint sensor tile (such as the fingerprint sensor tile sizes shown in FIG. 3A) may be used for authentication in a normal security or a low-security context.

According to some alternative implementations that involve obtaining fingerprint image data from multiple single digits during an enrollment process, the control system may determine and record the size of the largest digit, the contact area between the apparatus 101 and the largest digit, or both, as part of the enrollment process. According to some such implementations, during a subsequent authentication attempt via the same fingerprint sensor system that involves, or is expected to involve, a single digit, the control system may be configured to control the active area of the fingerprint sensor according to the recorded size of the largest digit or the contact area between the apparatus 101 and the largest digit.

During some alternative implementations that involve obtaining fingerprint image data from multiple single digits during an enrollment process, the control system may determine and record what portion of the potentially active area 302 was required to enroll the largest digit. According to some such implementations, during a subsequent authentication attempt via the same fingerprint sensor system that involves, or is expected to involve, a single digit, the control system may be configured to control the active area of the fingerprint sensor according to the recorded size of the portion of the potentially active area 302 that was required to enroll, or that was used to enroll, the largest digit.

According to this example, progress indicator 416 indicates a completion percentage for the enrollment of the current digit. In some examples, when the progress indicator 416 indicates a completion percentage of 100% for the enrollment of the current digit, this is an indication that a sufficient amount of fingerprint image data corresponding to the current digit has been successfully obtained from the fingerprint sensor system 102. The fingerprint image data may, for example, be used in a subsequent authentication process that will be performed by the control system 106.

Figure 5A:
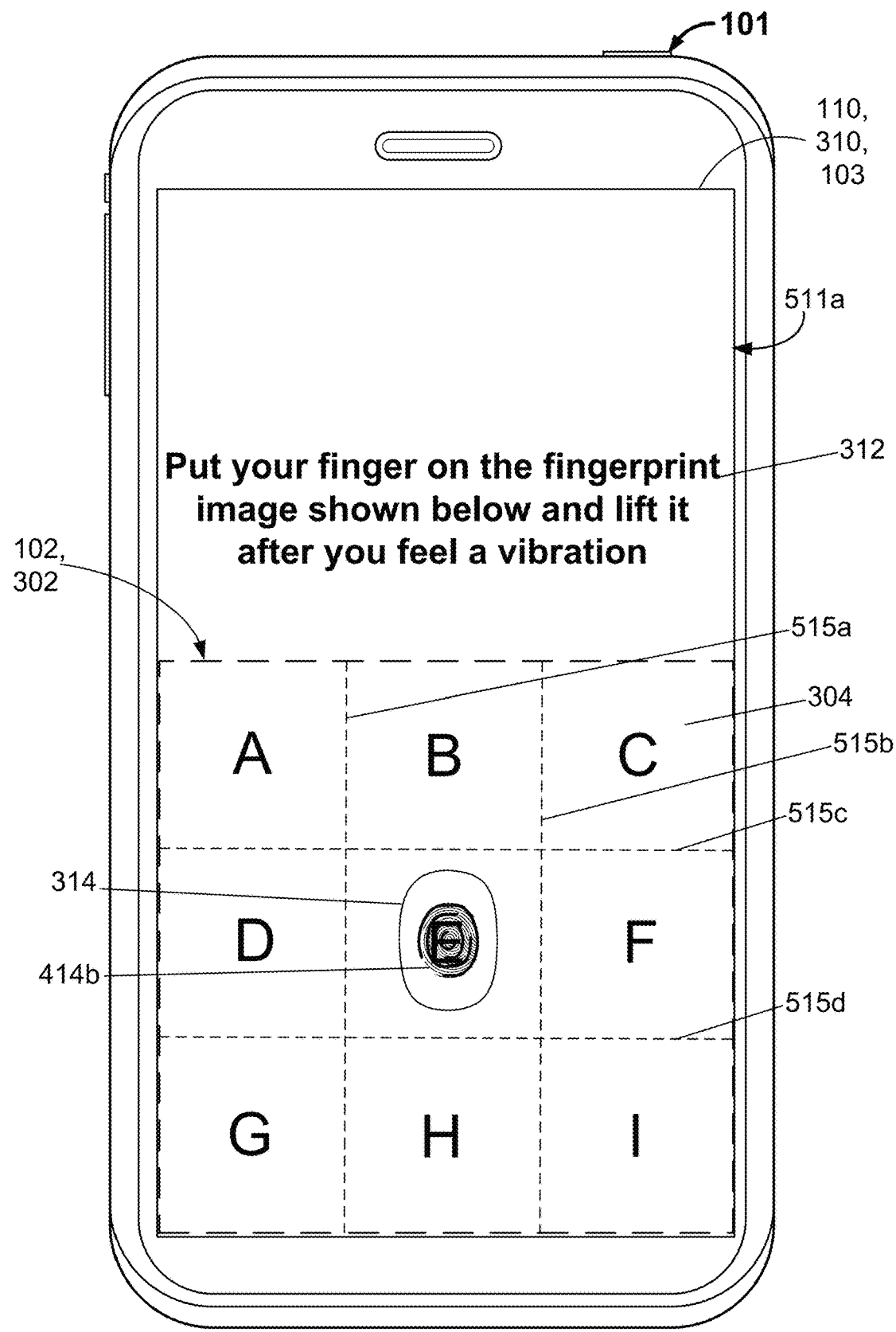
Figure 5B:
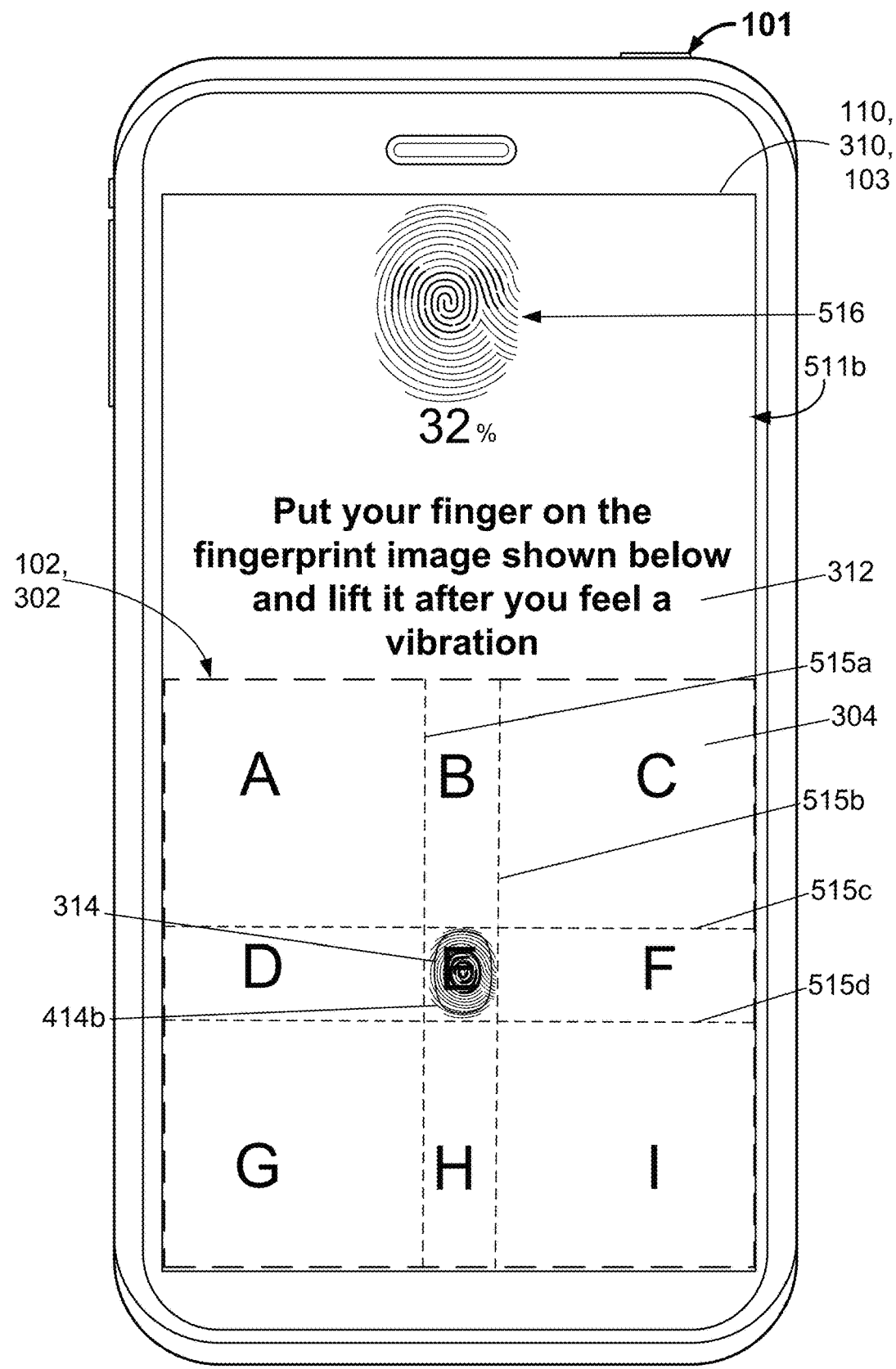

FIGS. 5A and 5B show additional examples of GUIs that may be presented during a process of enrolling a single digit using the apparatus shown in FIG. 3A. FIG. 5A shows an example of a GUI 511a. In this example, GUI 511a includes a textual prompt area 312 and a fingerprint icon 314. According to this example, the textual prompt area 312 includes a message prompting a user to put a finger on the fingerprint icon 314. In some implementations, the GUI 511a may include a textual prompt for the user to place a particular digit (such as the right thumb, the left pinky finger, etc.) on the fingerprint icon 314. Alternatively, or additionally, the GUI 511a (or another GUI disclosed herein) may include a textual prompt for the user to identify a particular digit this is placed, or will be placed, on the fingerprint icon 314. In some examples, the control system 106 (not shown) may be configured to initially activate only the fingerprint sensor tile E, or only any other fingerprint sensor tile in which the fingerprint icon 314 is displayed, for this stage of the enrollment process.

In this example, the area of a digit that is in contact with the apparatus 101 is indicated by the fingerprint image 414b. The control system would generally not control the display 310 to present the fingerprint image 414b to a user, whether during the enrollment process or otherwise. Instead, the fingerprint image 414b is shown merely to indicate the size of the digit and the area of a digit that is in contact with the apparatus 101. Similarly, as noted elsewhere herein, the control system would generally not control the display 310 to present any depiction of the fingerprint sensor tiles A-I to a user, whether during the enrollment process or otherwise.

In this example, the control system detects (for example, according to touch sensor data received from the touch sensor 103, according to fingerprint image data received from the fingerprint sensor system 102, or a combination thereof) that the area of a digit that is in contact with the apparatus 101 extends over only a portion of the fingerprint sensor tile E. According to this example, the control system is configured to decrease the active area of the fingerprint sensor 102 responsive to determining that that the area of a digit that is in contact with the apparatus 101 extends over only a portion of a fingerprint sensor tile, which is the fingerprint sensor tile E in this instance. In some such examples, the control system may be configured to decrease the active area of the fingerprint sensor 102 responsive to determining that that the area of a digit that is in contact with the apparatus 101 extends over less than a threshold portion of a fingerprint sensor tile, such as less than 80% of the fingerprint sensor tile, less than 75% of the fingerprint sensor tile, less than 70% of the fingerprint sensor tile, less than 65% of the fingerprint sensor tile, less than 60% of the fingerprint sensor tile, less than 55% of the fingerprint sensor tile, less than 50% of the fingerprint sensor tile, etc.

FIG. 5B shows an example of a GUI 511b. According to this example, the GUI 511b is presented after the GUI 511a is presented. In this example, GUI 511b includes a textual prompt area 312, a fingerprint icon 314 and a progress indicator 516. According to this example, the control system is configured to control fingerprint sensor tile sizes responsive to an area of the digit that is in contact with the apparatus 101, responsive to a determined or estimated digit size, responsive to a determined or estimated portion of the potentially active area 302 that will be used for obtaining fingerprint sensor data from the digit during an enrollment process, or a combination thereof. In this example, responsive to determining that that the area of a digit that is in contact with the apparatus 101 extends over only a portion of a fingerprint sensor tile, which may in some examples be less than a threshold portion of the fingerprint sensor tile, the control system has decreased the size of the fingerprint sensor tile E to approximate the portion of the potentially active area 302 that would be required to obtain fingerprint sensor data from the current digit. In this example, the areas of fingerprint sensor tiles B, D, E, F and H have temporarily been decreased and the areas of fingerprint sensor tiles A, C, G and I have temporarily been increased.

According to some alternative examples, responsive to determining that that the area of a digit that is in contact with the apparatus 101 extends over only a portion of a fingerprint sensor tile, the control system may decrease the size of the fingerprint sensor tile E in another way. In one such example, the control system may be configured to move the boundaries 515a and 515b to approximate the portion of the potentially active area 302 that would be required to obtain fingerprint sensor data from the current digit, as shown in FIG. 5B, but may be configured to maintain to the boundaries 515c and 515d as shown in FIG. 5A. In another such example, the control system may be configured to move the boundaries 515c and 515d to approximate the portion of the potentially active area 302 that would be required to obtain fingerprint sensor data from the current digit, as shown in FIG. 5B, but may be configured to maintain to the boundaries 515a and 515b as shown in FIG. 5A.

In some examples, the control system may determine and record the area of a digit that is in contact with the apparatus 101, the estimated size of the current digit, or both, as part of the enrollment process. Alternatively, or additionally, the control system may determine and record what portion of the potentially active area 302 was required to enroll, or was used to enroll, the current digit. In some examples in which the size of the fingerprint sensor tile E has been decreased, for example as shown in FIG. 5B, the control system may record the current size of the fingerprint sensor tile E. According to some such examples, the control system may, in some examples, be configured to activate a portion of the potentially active area 302 that is equal to the current size of the fingerprint sensor tile E in certain situations, responsive to certain conditions, or both. One such condition or situation may involve a subsequent authentication attempt via the same fingerprint sensor system that involves, or is expected to involve, the same digit.

Figure 6:
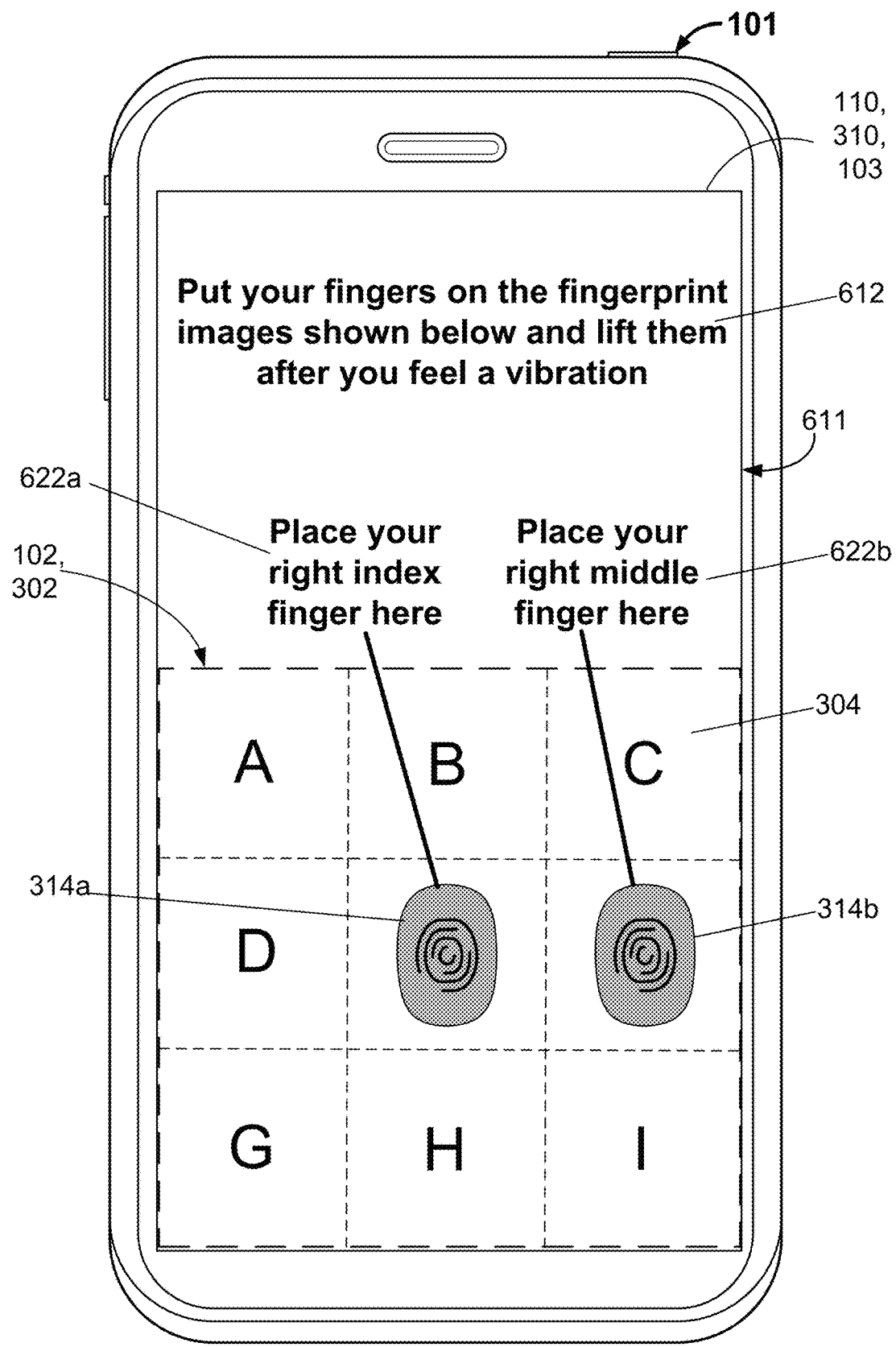
FIG. 6 shows an example of a GUI that may be presented during a process of enrolling multiple digits using the apparatus shown in FIG. 3A.

FIG. 6 shows an example of a GUI that may be presented during a process of enrolling multiple digits using the apparatus shown in FIG. 3A. FIG. 6 shows an example of a GUI 611. In this example, GUI 611 includes textual prompt areas 612 and 622, and fingerprint icons 314a and 314b. According to this example, the textual prompt area 312 includes a message prompting a user to place fingers on the fingerprint icons 314a and 314b. In this example, the GUI 611 includes textual prompts for the user to place particular digits on the fingerprint icons 314a and 314b: according to this example, the textual prompt area 622a includes a textual prompt for the user to place the user's right index finger on the fingerprint icon 314a and the textual prompt area 622b includes a textual prompt for the user to place the user's right middle finger on the fingerprint icon 314b. In some examples, the control system 106 (not shown) may be configured to initially activate only the fingerprint sensor tiles E and F, in which the fingerprint icons 314a and 314b are displayed, for this stage of the enrollment process.

In some examples, if the control system determines that the areas of fingerprint sensor tiles E and F are neither too small nor too large (for example, if the user's right index finger and right middle finger both fit within the areas of fingerprint sensor tiles E and F, respectively, and occupy more than a threshold percentage of the fingerprint sensor tiles E and F, such as one of the percentage thresholds in the following paragraph), the control system may use the original or default size of fingerprint sensor tiles E and F for enrolling the user's right index and right middle fingers. In some such examples, the control system may store information indicating that the original or default size of fingerprint sensor tiles E and F were used for enrolling the user's right index and right middle fingers.

In some instances, the control system may detect (for example, according to touch sensor data received from the touch sensor 103, according to fingerprint image data received from the fingerprint sensor system 102, or a combination thereof) that the area of one or more of the digits in contact with the apparatus 101 extend over only a portion of the fingerprint sensor tile E, the fingerprint sensor tile F, or both. According to this example, the control system is configured to decrease the active area of the fingerprint sensor 102 responsive to determining that the area of one or more of the digits in contact with the apparatus 101 extends over only a portion of a fingerprint sensor tile. In some such examples, the control system may be configured to decrease the active area of the fingerprint sensor 102 responsive to determining that that the area of one or more of the digits in contact with the apparatus 101 extends over less than a threshold portion of a corresponding fingerprint sensor tile, such as less than 80% of the fingerprint sensor tile, less than 75% of the fingerprint sensor tile, less than 70% of the fingerprint sensor tile, less than 65% of the fingerprint sensor tile, less than 60% of the fingerprint sensor tile, less than 55% of the fingerprint sensor tile, less than 50% of the fingerprint sensor tile, etc.

According to some examples, the control system may be configured to control one or more fingerprint sensor tile sizes responsive to a determined or estimated digit size of one or more digits, responsive to the size of one or more areas of one or more digits in contact with the apparatus 101, responsive to a determined or estimated portion of the potentially active area 302 used for obtaining fingerprint sensor data from the one or more digits during an enrollment process, or combinations thereof. In some examples, responsive to determining that that the area of one or more digits in contact with the apparatus 101 extends over only a portion of a fingerprint sensor tile, which may in some examples be less than a threshold portion of the fingerprint sensor tile, the control system may decrease the size of one or more fingerprint sensor tiles (in this example, the fingerprint sensor tile E, the fingerprint sensor tile F, or both) to approximate the portions of the potentially active area 302 that would be required to obtain fingerprint sensor data from both of the digits that are currently being enrolled.

In some examples, the control system may determine that that the area of one or more digits in contact with the apparatus 101 extends over more than the area of a fingerprint sensor tile. According to some examples, responsive to determining that that the area of one or more digits in contact with the apparatus 101 extends over more than a threshold portion of a neighboring fingerprint sensor tile (such as more than 5%, more than 10%, more than 15%, more than 20%, more than 25%, more than 30%, more than 35%, more than 40%, etc.), the control system may increase the size of one or more fingerprint sensor tiles (in this example, the fingerprint sensor tile E, the fingerprint sensor tile F, or both) to approximate the portions of the potentially active area 302 that would be required to obtain fingerprint sensor data from both of the digits that are currently being enrolled.

In some examples, the control system may determine and record the size of the current digits, the area(s) of the apparatus 101 in contact with the current digits, or both, as part of the enrollment process. Alternatively, or additionally, the control system may determine and record what portion of the potentially active area 302 was required to enroll the current digits. In some examples in which the size of the fingerprint sensor tile E, fingerprint tile F, or a combination thereof, has been increased or decreased, the control system may record the increased or decreased size of the fingerprint sensor tile E, fingerprint tile F, or a combination thereof. According to some such examples, the control system may be configured to activate a portion of the potentially active area 302 that is equal to the sizes of the fingerprint sensor tiles that were used for enrollment in certain situations, responsive to certain conditions, or a combination thereof. One such condition or situation may involve a subsequent authentication attempt via the same fingerprint sensor system that involves, or is expected to involve, the same digits.

In some implementations, if several multiple-digit combinations (such as the right index and middle fingers, the right middle and ring fingers, the left index and middle fingers, the left middle and ring fingers, etc.) are enrolled during a fingerprint enrollment process, the control system may determine and record the size of each multiple-digit combination, the area(s) of the apparatus 101 in contact with each multiple-digit combination, or both, as part of the enrollment process. According to some such implementations, during a subsequent authentication attempt via the same fingerprint sensor system that involves, or is expected to involve, a particular multiple-digit combination, the control system may be configured to control the active area of the fingerprint sensor according to the recorded size of the multiple-digit combination or the area(s) of the apparatus 101 in contact with each multiple-digit combination during the enrollment process.

According to some alternative implementations, the control system may determine and record the size of the largest multiple-digit combination, the area(s) of the apparatus 101 in contact with the largest multiple-digit combination, or both, as part of the enrollment process. According to some such implementations, during a subsequent authentication attempt via the same fingerprint sensor system that involves, or is expected to involve, any multiple-digit combination, the control system may be configured to control the active area of the fingerprint sensor according to the recorded size of the largest multiple-digit combination or the area(s) of the apparatus 101 in contact with the largest multiple-digit combination during the enrollment process.

Alternatively, or additionally, the control system may determine and record what portion of the potentially active area 302 was required to enroll each multiple-digit combination. According to some such implementations, during a subsequent authentication attempt via the same fingerprint sensor system that involves, or is expected to involve, a particular multiple-digit combination, the control system may be configured to control the active area of the fingerprint sensor according to the portion of the potentially active area 302 was required, or used, to enroll that particular multiple-digit combination.

According to some alternative implementations, the control system may determine and record the size of the largest portion of the potentially active area 302 that was required to enroll each multiple-digit combination of a plurality (two or more) multiple-digit combinations during an enrollment process. According to some such implementations, during a subsequent authentication attempt via the same fingerprint sensor system that involves, or is expected to involve, any multiple-digit combination, the control system may be configured to control the active area of the fingerprint sensor according to the recorded size of the largest portion of the potentially active area 302 that was used for multiple-digit enrollment during the enrollment process.

According to some examples, at least one of the one or more active fingerprint sensor area criteria disclosed herein (for example, with reference to FIG. 2) may correspond to an orientation of the device that includes the fingerprint sensor system. The orientation may, in some examples, be determined relative to a position of a hand in which the device is being held or relative to a position of one or more digits that are expected to be used during an authentication process. Alternatively, or additionally, at least one of the one or more active fingerprint sensor area criteria disclosed herein may correspond to the hand in which the device that includes the fingerprint sensor system is being held, which digit or digits have most recently been touching the device, or combinations thereof.

Figure 7:
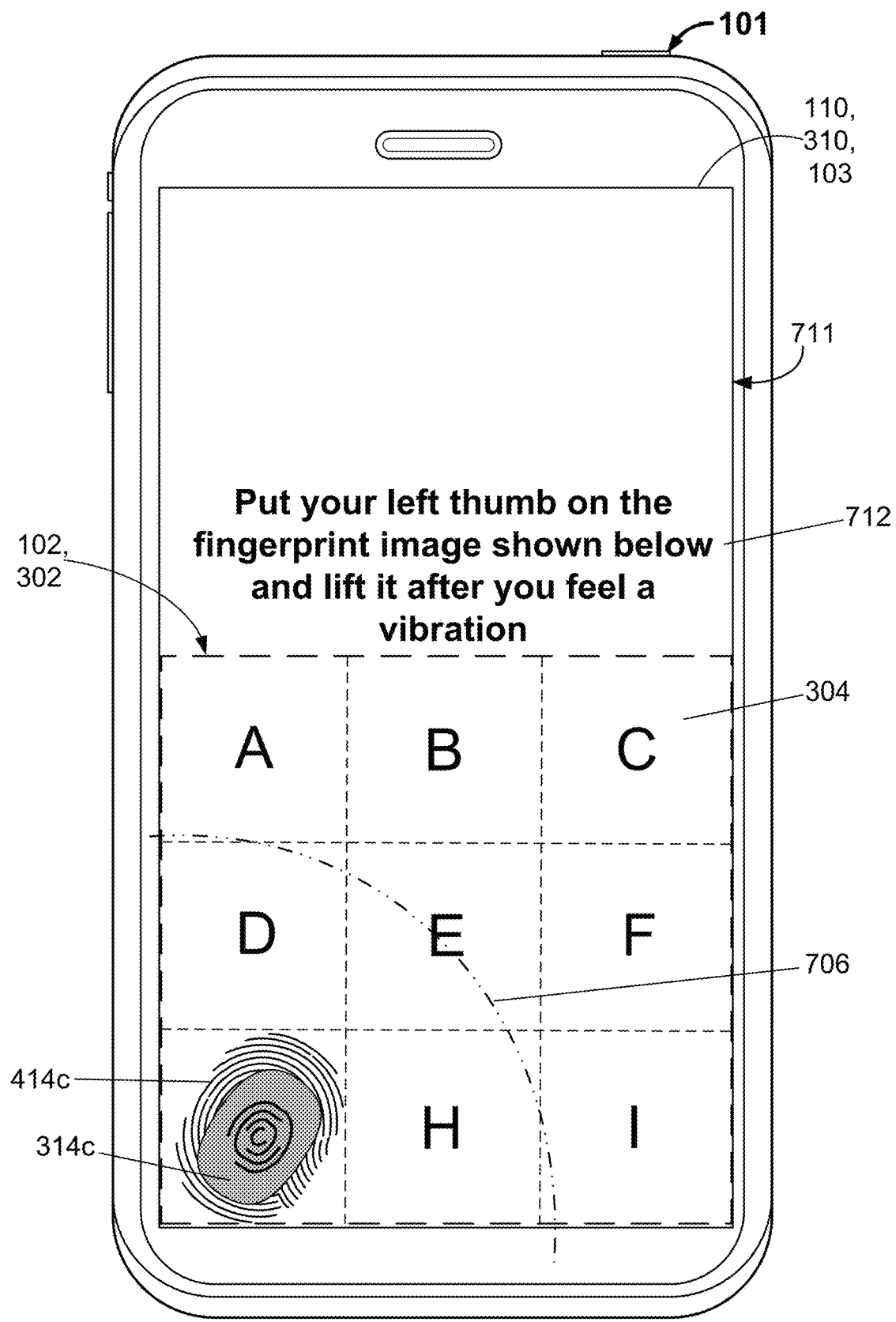
FIG. 7 shows an example of an apparatus configured to perform at least some disclosed methods.

FIG. 7 shows an example of an apparatus configured to perform at least some disclosed methods. As with other disclosed examples, the types, numbers and arrangements of elements that are shown in FIG. 7 are merely presented by way of example. Other examples may include different types of elements, numbers of elements, arrangements of elements, or combinations thereof.

In this example, the apparatus 101 is an instance of the apparatus 101 of FIG. 1. In this implementation, the apparatus 101 is a mobile device that includes a fingerprint sensor system 102, a control system 106 (not shown in FIG. 7) and a display system 110. The fingerprint sensor system 102 may be, or may include, an ultrasonic fingerprint sensor, an optical fingerprint sensor, or another type of fingerprint sensor.

As noted above, in some examples the active fingerprint sensor area controlling block 210 of FIG. 2 may be based, at least in part, on one or more active fingerprint sensor area criteria. In some examples, the one or more active fingerprint sensor area criteria may correspond to current usage information, user preference data, or combinations thereof. The user preference data may, in some examples, be received from the user, e.g., via a graphical user interface presented on the display system 110. Alternatively, or additionally, the user preference data may be determined or estimated from how the apparatus 101 is actually used. In some examples, the current usage information may be determined according to input from an inertial sensor system, input from the fingerprint sensor system 102, input from the touch sensor system 103, etc., such as data indicating the hand with which the user normally holds, or is currently holding, the apparatus 101.

For example, the control system may determine that the user normally holds the apparatus in her left hand and normally uses her left thumb for fingerprint authentication during a single-handed operational mode. In some such examples, block 210 may be based, at least in part, on which fingerprint sensor areas are reachable by her left thumb during a single-handed operational mode. The dashed line 706 of FIG. 7 indicates the area within which fingerprint image data corresponding with her left thumb have been received by the fingerprint sensor system 102: in this example, fingerprint image data corresponding with her left thumb have been received by fingerprint sensor areas D, G, H and portions of fingerprint sensor area E. Alternatively, or additionally, the dashed line 706 of FIG. 7 may indicate the area within which recent digit touches have been detected by the touch sensor system 103.

According to this example, control system is controlling the display system 110 to present the GUI 711, which includes a textual prompt area 712 and a fingerprint icon 314c. In this example, the area of the user's left thumb that was in contact with the apparatus 101 during an earlier enrollment process is indicated by the fingerprint image 414c. According to this example, the fingerprint icon 314c and the fingerprint image 414c are shown in orientation in which the user has previously presented her left thumb during one or more prior fingerprint-based authentication processes. As noted elsewhere herein, the control system would generally not control the display 310 to present the fingerprint image 414c to a user, whether during the authentication process or otherwise. Instead, the fingerprint image 414c is shown merely to indicate the size of the digit and the area of a digit that is in contact with the apparatus 101. According to this example, the textual prompt area 712 includes a prompt for the user to place her left thumb on the fingerprint In this example, the control system is configured to control the active fingerprint sensor area based, at least in part, on to the area of the user's left thumb that was in contact with the apparatus 101 during an earlier enrollment process, as indicated by the fingerprint image 414c, as well as the expected orientation of the user's left thumb based on recently-received data from the fingerprint sensor system 102, the touch sensor system 103, or a combination thereof. In the example shown in FIG. 7, the control system has determined that the normal or default size of the fingerprint sensor tile G will be sufficient for the current authentication process, based in part on the expected orientation of the user's left thumb during the authentication process. One may note that the normal or default size of the fingerprint sensor tile G might not be sufficient for the current authentication process if the user were to present her thumb in a different orientation. In some alternative examples, responsive to determining that the normal or default size of the fingerprint sensor tile G will not be sufficient for the current authentication process, the control system may increase the size of the fingerprint sensor tile G during the current authentication process.

Implementation examples are described in the following numbered clauses:

1. A method, of controlling an active fingerprint sensor area of a fingerprint sensor system, the method comprising: determining, by a control system of a device that includes the fingerprint sensor system, one or more active fingerprint sensor area criteria, wherein at least one of the one or more active fingerprint sensor area criteria involves a security level; and controlling, by the control system, the active fingerprint sensor area according to the one or more active fingerprint sensor area criteria.
2. The method of clause 1, further including providing a prompt corresponding with the active fingerprint sensor area.
3. The method of clause 2, where providing the prompt involves controlling a display to present an image corresponding with the active fingerprint sensor area.
4. The method of any one of clauses 1-3, where at least one of the one or more active fingerprint sensor area criteria involves functionality of the device that includes the fingerprint sensor system.
5. The method of clause 4, where the functionality includes functionality of one or more software applications.
6. The method of any one of clauses 1-5, where controlling the active fingerprint sensor area involves activating a relatively larger fingerprint sensor area for a relatively higher security level.
7. The method of any one of clauses 1-6, where the security level corresponds to a data security level.
8. The method of any one of clauses 1-7, where the security level corresponds to a software application security level.
9. The method of any one of clauses 1-8, where at least one of the one or more active fingerprint sensor area criteria corresponds to a size of one or more digits involved in an enrollment process.
10. The method of any one of clauses 1-9, where at least one of the one or more active fingerprint sensor area criteria corresponds to a fingerprint sensor area used for obtaining fingerprint sensor data from one or more digits involved in an enrollment process.
11. The method of any one of clauses 1-10, where at least one of the one or more active fingerprint sensor area criteria involves one or more recent authentication attempts via the fingerprint sensor system.
12. The method of clause 11, where controlling the active fingerprint sensor area involves controlling the active fingerprint sensor area to correspond with a digit size used during the one or more recent authentication attempts.
13. The method of clause 11 or clause 12, where controlling the active fingerprint sensor area involves controlling the active fingerprint sensor area according to an authentication success rate during a plurality of recent authentication attempts.
14. The method of any one of clauses 1-13, where controlling the active fingerprint sensor area involves dynamically controlling a fingerprint sensor tile size.

15. The method of any one of clauses 1-14, where at least one of the one or more active fingerprint sensor area criteria corresponds to an orientation of the device that includes the fingerprint sensor system.
16. An apparatus, including: a fingerprint sensor system including an active fingerprint sensor area; and a control system configured for communication with the fingerprint sensor system, the control system being further configured to: determine one or more active fingerprint sensor area criteria, where at least one of the one or more active fingerprint sensor area criteria involves a security level; and control the active fingerprint sensor area according to the one or more active fingerprint sensor area criteria.
17. The apparatus of clause 16, where the control system is further configured to provide a prompt corresponding with the active fingerprint sensor area.
18. The apparatus of clause 17, where the apparatus further includes a display and where providing the prompt involves controlling the display to present an image corresponding with the active fingerprint sensor area.
19. The apparatus of any one of clauses 16-18, where at least one of the one or more active fingerprint sensor area criteria involves functionality of the apparatus.
20. The apparatus of clause 19, where the functionality includes functionality of one or more software applications.
21. The apparatus of any one of clauses 16-20, where controlling the active fingerprint sensor area involves activating a relatively larger fingerprint sensor area for a relatively higher security level.
22. The apparatus of any one of clauses 16-21, where the security level corresponds a data security level, a software application security level, or a combination thereof.
23. The apparatus of any one of clauses 16-22, where at least one of the one or more active fingerprint sensor area criteria corresponds to a size of one or more digits involved in an enrollment process, a fingerprint sensor area used for obtaining fingerprint sensor data from one or more digits involved in an enrollment process, or combinations thereof.
24. The apparatus of any one of clauses 16-23, where controlling the active fingerprint sensor area involves controlling the active fingerprint sensor area to correspond with a digit size used during one or more recent authentication attempts or controlling the active fingerprint sensor area according to an authentication success rate during a plurality of recent authentication attempts.
25. The apparatus of any one of clauses 16-24, where controlling the active fingerprint sensor area involves dynamically controlling a fingerprint sensor tile size.
26. An apparatus, including: a fingerprint sensor system including an active fingerprint sensor area; and control means for: determining one or more active fingerprint sensor area criteria, where at least one of the one or more active fingerprint sensor area criteria involves a security level; and controlling the active fingerprint sensor area according to the one or more active fingerprint sensor area criteria.
27. The apparatus of clause 26, where controlling the active fingerprint sensor area involves activating a relatively larger fingerprint sensor area for a relatively higher security level.
28. The apparatus of clause 26 or clause 27, where the security level corresponds a data security level, a software application security level, or a combination thereof.
29. One or more non-transitory media having software stored thereon, the software including instructions for controlling one or more devices to perform a method of controlling an active fingerprint sensor area of a fingerprint sensor system, the method including: determining, by a control system of a device that includes the fingerprint sensor system, one or more active fingerprint sensor area criteria, where at least one of the one or more active fingerprint sensor area criteria involves a security level; and controlling, by the control system, the active fingerprint sensor area according to the one or more active fingerprint sensor area criteria.
30. The one or more non-transitory media clause 29, where controlling the active fingerprint sensor area involves activating a relatively larger fingerprint sensor area for a relatively higher security level.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method of controlling an active fingerprint sensor area of a fingerprint sensor system, the method comprising:
   determining, by a control system of a device that includes the fingerprint sensor system, one or more active fingerprint sensor area criteria, wherein at least one of the one or more active fingerprint sensor area criteria involves a security level; and
   controlling, by the control system, the active fingerprint sensor area according to the one or more active fingerprint sensor area criteria, wherein controlling the active fingerprint sensor area involves activating a relatively larger fingerprint sensor area for a single-digit authentication process corresponding to a relatively higher security level and activating a relatively smaller fingerprint sensor area for a single-digit authentication process corresponding to a relatively lower security level.

2. The method of claim 1, further comprising providing a prompt corresponding with the active fingerprint sensor area.

3. The method of claim 2, wherein providing the prompt involves controlling a display to present an image corresponding with the active fingerprint sensor area.

4. The method of claim 1, wherein at least one of the one or more active fingerprint sensor area criteria involves functionality of the device that includes the fingerprint sensor system.

5. The method of claim 4, wherein the functionality includes functionality of one or more software applications.

6. The method of claim 1, wherein the security level corresponds to a data security level.

7. The method of claim 1, wherein the security level corresponds to a software application security level.

8. The method of claim 1, wherein at least one of the one or more active fingerprint sensor area criteria corresponds to a size of a digit involved in an enrollment process.

9. The method of claim 1, wherein at least one of the one or more active fingerprint sensor area criteria corresponds to a fingerprint sensor area used for obtaining fingerprint sensor data from a digit involved in an enrollment process.

10. The method of claim 1, wherein at least one of the one or more active fingerprint sensor area criteria involves one or more recent authentication attempts via the fingerprint sensor system.

11. The method of claim 10, wherein controlling the active fingerprint sensor area involves controlling the active fingerprint sensor area to correspond with a digit size used during the one or more recent authentication attempts.

12. The method of claim 10, wherein controlling the active fingerprint sensor area involves controlling the active fingerprint sensor area according to an authentication success rate during a plurality of recent authentication attempts.

13. The method of claim 1, wherein controlling the active fingerprint sensor area involves dynamically controlling a fingerprint sensor tile size.

14. The method of claim 1, wherein at least one of the one or more active fingerprint sensor area criteria corresponds to an orientation of the device that includes the fingerprint sensor system.

15. An apparatus, comprising:
a fingerprint sensor system including an active fingerprint sensor area; and
a control system configured for communication with the fingerprint sensor system, the control system being further configured to:
determine one or more active fingerprint sensor area criteria, wherein at least one of the one or more active fingerprint sensor area criteria involves a security level; and
control the active fingerprint sensor area according to the one or more active fingerprint sensor area criteria, wherein controlling the active fingerprint sensor area involves activating a relatively larger fingerprint sensor area for a single-digit authentication process corresponding to a relatively higher security level and activating a relatively smaller fingerprint sensor area for a single-digit authentication process corresponding to a relatively lower security level.

16. The apparatus of claim 15, wherein the control system is further configured to provide a prompt corresponding with the active fingerprint sensor area.

17. The apparatus of claim 16, wherein the apparatus further comprises a display and wherein providing the prompt involves controlling the display to present an image corresponding with the active fingerprint sensor area.

18. The apparatus of claim 15, wherein at least one of the one or more active fingerprint sensor area criteria involves functionality of the apparatus.

19. The apparatus of claim 18, wherein the functionality includes functionality of one or more software applications.

20. The apparatus of claim 15, wherein the security level corresponds a data security level, a software application security level, or a combination thereof.

21. The apparatus of claim 15, wherein at least one of the one or more active fingerprint sensor area criteria corresponds to a size of a digit involved in an enrollment process, a fingerprint sensor area used for obtaining fingerprint sensor data from one or more digits involved in an enrollment process, or combinations thereof.

22. The apparatus of claim 15, wherein controlling the active fingerprint sensor area involves controlling the active fingerprint sensor area to correspond with a digit size used during one or more recent authentication attempts or controlling the active fingerprint sensor area according to an authentication success rate during a plurality of recent authentication attempts.

23. The apparatus of claim 15, wherein controlling the active fingerprint sensor area involves dynamically controlling a fingerprint sensor tile size.

24. An apparatus, comprising:
a fingerprint sensor system including an active fingerprint sensor area; and
control means for:
determining one or more active fingerprint sensor area criteria, wherein at least one of the one or more active fingerprint sensor area criteria involves a security level; and
controlling the active fingerprint sensor area according to the one or more active fingerprint sensor area criteria, wherein controlling the active fingerprint sensor area involves activating a relatively larger fingerprint sensor area for a single-digit authentication process corresponding to a relatively higher security level and activating a relatively smaller fingerprint sensor area for a single-digit authentication process corresponding to a relatively lower security level.

25. The apparatus of claim 24, wherein the security level corresponds a data security level, a software application security level, or a combination thereof.

26. One or more non-transitory media having software stored thereon, the software including instructions for controlling one or more devices to perform a method of controlling an active fingerprint sensor area of a fingerprint sensor system, the method comprising:
determining, by a control system of a device that includes the fingerprint sensor system, one or more active fingerprint sensor area criteria, wherein at least one of the one or more active fingerprint sensor area criteria involves a security level; and
controlling, by the control system, the active fingerprint sensor area according to the one or more active fingerprint sensor area criteria, wherein controlling the active fingerprint sensor area involves activating a relatively larger fingerprint sensor area for a single-digit authentication process corresponding to a relatively higher security level and activating a relatively smaller fingerprint sensor area for a single-digit authentication process corresponding to a relatively lower security level.

* * * * *